United States Patent
Berrahil et al.

(10) Patent No.: US 12,494,982 B2
(45) Date of Patent: Dec. 9, 2025

(54) TESTING ENVIRONMENT FOR COMMUNICATION SERVICES

(71) Applicant: DISH Wireless L.L.C., Englewood, CO (US)

(72) Inventors: Said Berrahil, Denver, CO (US); Andrew Trujillo, Littleton, CO (US)

(73) Assignee: Boost SubscriberCo L.L.C., Englewood, CO (US)

(*) Notice: Subject to any disclaimer, the term of this patent is extended or adjusted under 35 U.S.C. 154(b) by 365 days.

(21) Appl. No.: 18/183,644

(22) Filed: Mar. 14, 2023

(65) Prior Publication Data

US 2023/0300057 A1    Sep. 21, 2023

Related U.S. Application Data

(60) Provisional application No. 63/320,172, filed on Mar. 15, 2022.

(51) Int. Cl.
*G01R 31/08* (2020.01)
*H04L 43/50* (2022.01)

(52) U.S. Cl.
CPC ................... *H04L 43/50* (2013.01)

(58) Field of Classification Search
CPC ........................................... H04L 43/50
USPC .......................................... 370/252
See application file for complete search history.

(56) References Cited

U.S. PATENT DOCUMENTS

| | | | |
|---|---|---|---|
| 2015/0358248 A1* | 12/2015 | Saha | H04L 41/0895 709/226 |
| 2018/0316559 A1* | 11/2018 | Thulasi | H04L 41/5041 |
| 2019/0342187 A1* | 11/2019 | Zavesky | H04L 41/40 |
| 2023/0033886 A1* | 2/2023 | Goswami | H04L 43/20 |

* cited by examiner

*Primary Examiner* — Temica M Beamer
(74) *Attorney, Agent, or Firm* — Seed Intellectual Property Law Group LLP

(57) ABSTRACT

Technologies for facilitating testing for a communications network are disclosed. An example method includes maintaining a hierarchy of testing environments that replicate at least part of a network core of the 5G communications network to be consistent with a current declared state of the communications network. The network core of the communications network is established virtually using a cloud computing service and the hierarchy of testing environments are generated via the cloud computing service. The method also includes evaluating network functions for entry into or exiting testing environments in the hierarchy, and tracking and recording data associated with testing of the network functions in individual testing environments.

20 Claims, 4 Drawing Sheets

TESTING ENVIRONMENT FOR COMMUNICATION SERVICES

BACKGROUND

In telecommunications, 5G is the fifth-generation technology standard for broadband cellular networks. Legacy method of testing and integrating network functions in operator labs can slow down the operator's ability to develop, test, and rollout network features and services. There is a need for technologies that facilitate efficient development and testing of network functions for communication services.

BRIEF SUMMARY

Legacy method of integrating and testing communications network functions in the operator labs can slow down the operator's ability to develop, test, and rollout network features and services. Communication service providers may want to change this paradigm and to achieve more efficient and flexible testing. This disclosure provides testing framework and strategy a communication service provider (e.g., a 5G wireless service provider) can employ as part of its partnership with a cloud computing service (or other remote or decentralized computing service) to enable independent, parallel, and rapid testing by independent software vendors (ISVs), device vendors, roaming partners, or other third parties.

In some implementations of a communications network (e.g., a 5G network), the entirety or at least some network functions, components, or elements of the network core (e.g., 5G core) can be implemented logically or virtually, via one or more cloud service providers. The network core communicates with various cell sites that are located in different geographic or network locations, subjecting to control of same or different entities. The communication service provider partners can be provides environments that replicate any or all the communication service provider's logical data centers based on their specific needs, e.g., to develop or test network functions or services.

In some embodiments, a computer-implemented method for facilitating testing associated with a 5G communications network includes maintaining a hierarchy of testing environments that replicate at least part of a network core of the 5G communications network to be consistent with a current declared state of the communications network. The network core of the communications network is established virtually using one or more cloud computing services and the hierarchy of testing environments are generated via the one or more cloud computing services. The method also includes evaluating one or more network functions associated with a first testing partner for entry into or exiting a first set of testing environments in the hierarchy, and tracking and recording data associated with testing of the one or more network functions in individual testing environments of the first set.

In some embodiments, the method further comprises, in a temporally parallel or partially overlapping manner with the evaluating of the one or more network functions associated with the first testing partner, evaluating one or more network functions associated with a second testing partner for entry into or exiting a second set of testing environments in the hierarchy. In some embodiments, the first set of testing environments and the second set of testing environments have one or more testing environments in common. In some embodiments, the evaluating of the one or more network functions associated with the second testing partner is performed independently from the evaluating of the one or more network functions associated with the first testing partner.

In some embodiments, the method further comprises causing the one or more network functions to automatically enter or exit individual testing environments in accordance with the hierarchy, as code transferred via rule-enforceable pipelines. In some embodiments, the current declared state of the communications network includes versions, configurations, topology, connectivity, and design of network functions currently running to carry live traffic for the communications network. In some embodiments, the hierarchy of testing environments include a production environment as a highest environment that represents the current declared state of the communications network.

In some embodiments, a testing facilitation system for a communications network includes at least one memory that stores computer executable instructions, and at least one processor that executes the computer executable instructions to cause actions to be performed. The actions include maintaining a hierarchy of testing environments that replicate at least part of a network core of the communications network to be consistent with a current declared state of the communications network. The network core of the communications network is established virtually using one or more cloud computing services and the hierarchy of testing environments are generated via the one or more cloud computing services. The actions also include evaluating one or more network functions associated with a first testing partner for entry into or exiting a first set of testing environments in the hierarchy, and tracking and recording data associated with testing of the one or more network functions in individual testing environments of the first set.

In some embodiments, a non-transitory computer-readable medium stores contents that, when executed by one or more processors, cause the one or more processors to perform actions. The actions include maintaining a hierarchy of testing environments that replicate at least part of a network core of a communications network to be consistent with a current declared state of the communications network. The network core of the communications network is established virtually using one or more cloud computing services and the hierarchy of testing environments are generated via the one or more cloud computing services. The actions also include evaluating one or more network functions associated with a first testing partner for entry into or exiting a first set of testing environments in the hierarchy, and tracking and recording data associated with testing of the one or more network functions in individual testing environments of the first set.

Figure 1:
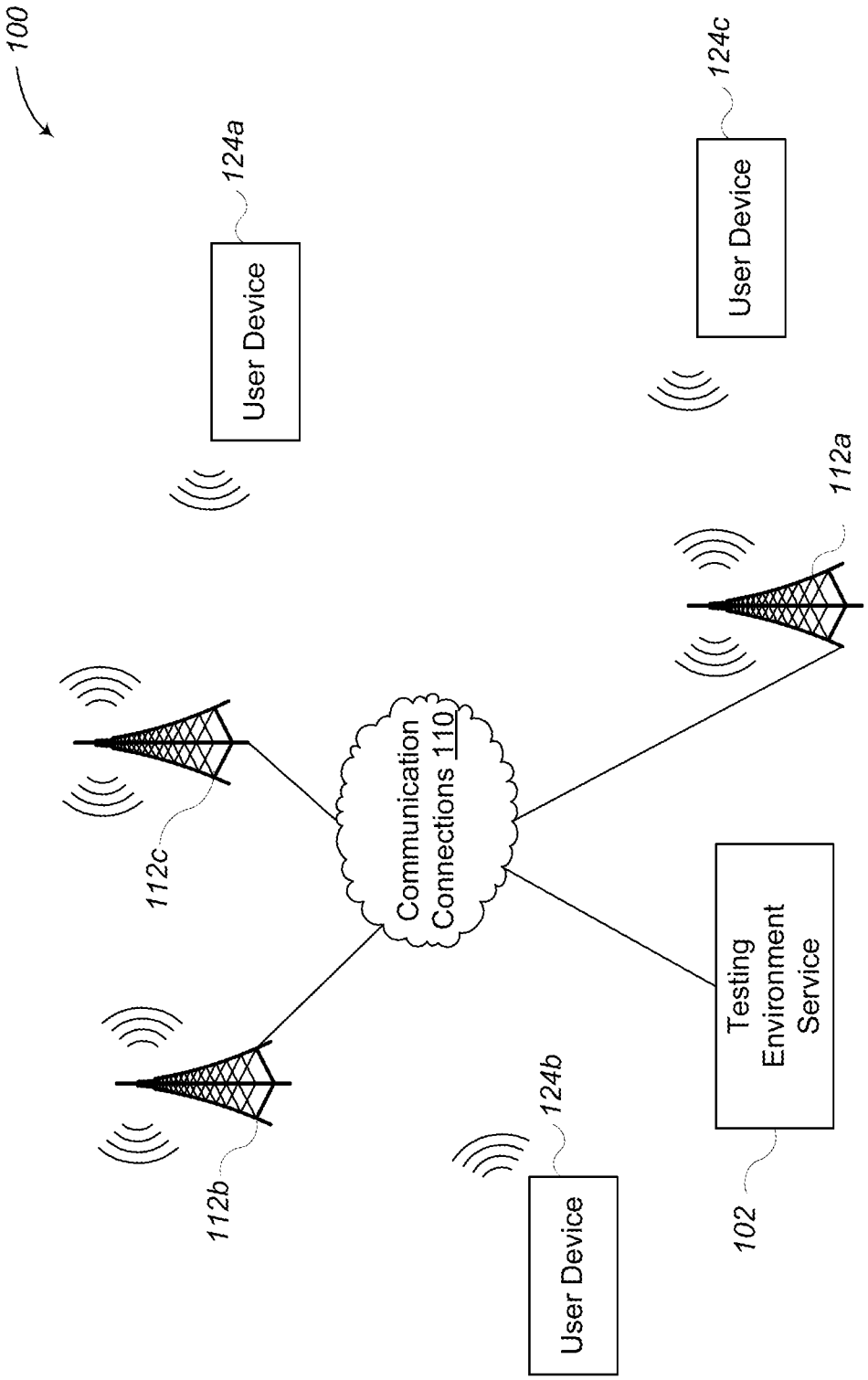
FIG. 1 is a block diagram illustrating an example networked environment to facilitate testing for a communications network, in accordance with some embodiments of the techniques described herein.

In the drawings, identical reference numbers identify identical elements or elements in the same group and class. The sizes and relative positions of elements in the drawings are not necessarily drawn to scale. For example, the shapes of various elements and angles are not necessarily drawn to scale, and some of these elements are enlarged and positioned to improve drawing legibility. Further, the particular shapes of the elements as drawn are not intended to convey any information regarding the actual shape of the particular elements and have been selected for ease of recognition in the drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

FIG. 1 is a block diagram illustrating an example networked environment 100 to facilitate testing for a communications network in accordance with some embodiments of the techniques described herein. Environment 100 includes a plurality of cells 112a-112c, a plurality of user devices 124a-124b, a testing environment service 102, and communication connections 110. Illustratively, the cells 112a-112c correspond to cell sites (e.g., cellular towers) that together implement a 5G cellular communications network. The cells 112a-112c may include or be in communication with base stations, radio back haul equipment, antennas, or other devices, which are not illustrated for ease of discussion.

Although embodiments are directed to 5G cellular communications, embodiments are not so limited and other types of cellular communications technology may also be utilized or implemented. In various embodiments, the cells 112a-112c may communicate with each other via communication connections 110. Communication connections 110 include one or more wired or wireless networks, which may include a series of smaller or private connected networks that carry information between the cells 112a-112c.

The user devices 124a-124c are computing devices that receive and transmit cellular communication messages or other data with the cells 112a-112c, e.g., via antennas or other means. Examples of user devices 124a-124c may include, but are not limited to, mobile devices, smartphones, tablets, cellular-enabled laptop computers, or other user equipment (UE) or computing devices that can communicate with a 5G cellular network.

In various embodiments, the testing environment service 102 can include one or more computing devices to perform testing environment facilitation related functions described herein. In some embodiments, the testing environment service 102 interfaces or otherwise communicates with one or more elements of the 5G network core via the communication connections 110. The 5G network core or at least some functions, components, or elements thereof can be implemented, virtually or logically, via cloud computing services provided by one or more cloud service providers. The testing environment service 102 can include or establish one or more virtual servers or systems to generate, maintain, modify, terminate, or otherwise control testing environments (e.g., implemented as virtual machines, processes, threads, or the like), via cloud computing services provided by the same or different cloud service provider(s). The interface between the testing environment service 102 and the core element(s) may be direct or may leverage an external API or other gateway. In some embodiments, the testing environment service 102 can interface or otherwise communicate with cell sites (e.g., cellular towers or controllers thereof), or with systems or devices external to the 5G network. In some embodiments, the testing environment service 102 is partly or entirely implemented inside or outside the 5G network core.

As will be described in more detail below, the testing environment service 102 can be implemented to enable parallel, rapid, and comprehensive testing by all suppliers for a communication service provider's communications network (e.g., 5G network) by using multiple environments, specifically instantiated to support the different development, integration, and testing activities that the communication service provider, and its partners require. The service 102 can facilitate reduction in the time required to roll out and integrate network functions, features, and services into the communication service provider's upper environments up to and including the production network. The service 102 provides ISVs the flexibility to instantiate and develop against any combination of or all the network functions included in the communication service provider's network declared state for its 5G network, facilitates to ensure that the output of lower environments align with the production environment. For example, containerized network functions (CNFs) exiting lower environments are deployable in production with no design change and only the variable attributes, such as IP addresses and dimensioning, may change for production deployment. The service 102 can create the capability to scale the testing environments with elasticity and terminate environments when they are no longer required. The service 102 can adopt applicable software development practice of developing against a mainline code stream in branches and merging them back into the mainline code—for communications networks.

The above description of the exemplary networked environment 100 and the various services, systems, networks, and devices therein is intended as a broad, non-limiting overview of an example environment in which various embodiments of the presently disclosed technologies may be implemented. FIG. 1 illustrates just one example of an operating environment, and the various embodiments discussed herein are not limited to such an environment. In particular, the networked environment 100 may contain other devices, systems, or media not specifically described herein.

Figure 2:
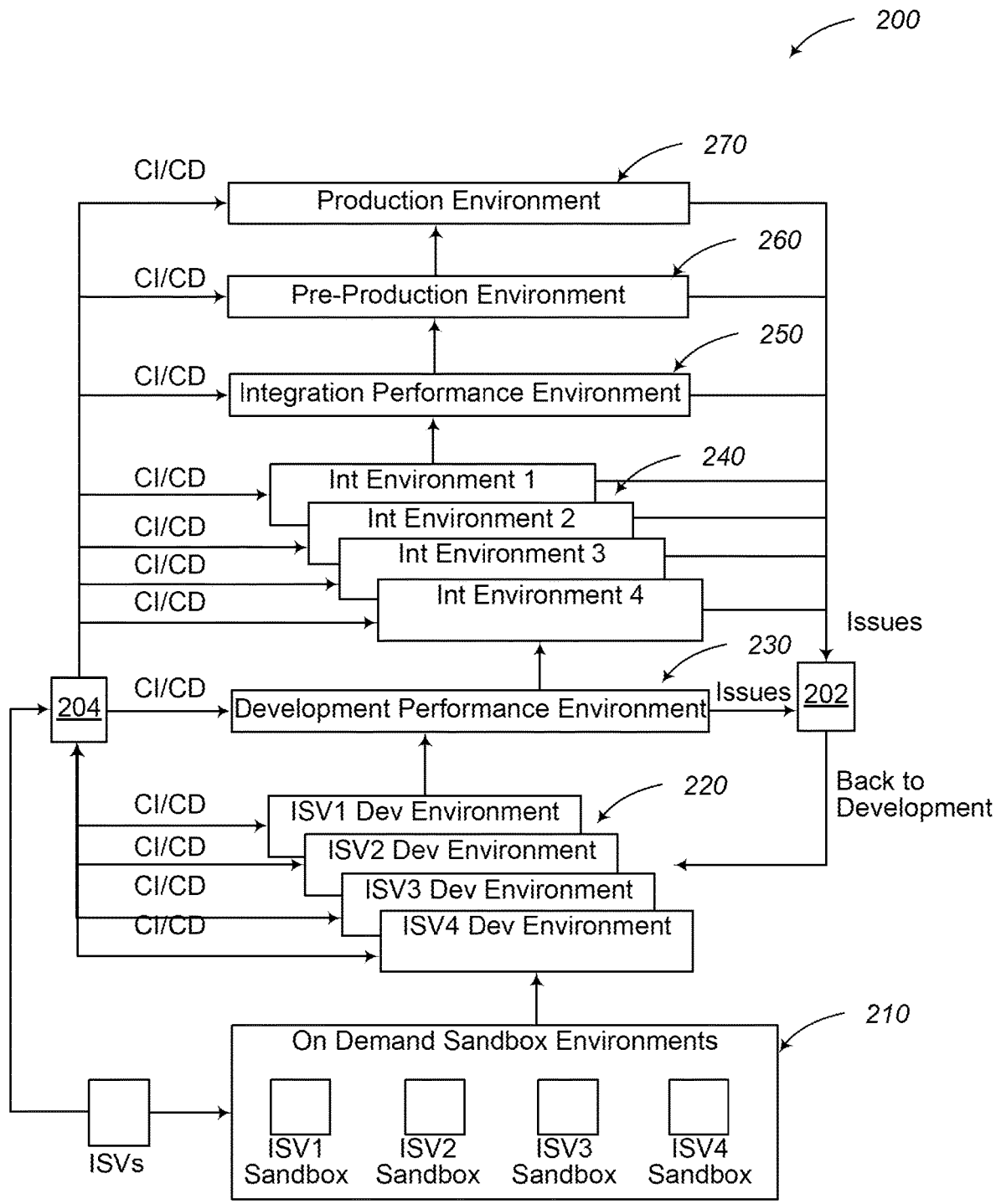
FIG. 2 illustrates an example framework of testing environments organized in a hierarchy, in accordance with some embodiments of the techniques described herein.

FIG. 2 illustrates an example framework 200 of testing environments organized in a hierarchy, in accordance with some embodiments of the techniques described herein. In various embodiments, the testing environments or their interactions are generated, maintained, modified, terminated, or otherwise controlled in real time, by the testing environment service 102 of FIG. 1.

As illustrated, a new ISV vendor introduced into the communication service provider's communications network ecosystem is provided a sandbox environment 210, through which the ISV can onboard its network functions, features, or services (e.g., under development or testing) into a cloud computing structure that implements or replicates the network core (e.g., 5G core) of the communications network. The sandbox environment 210 allows ISVs or other partners to complete basic work required to enable onboarding of their network functions or platforms into the cloud computing service.

The ISV can then instantiate, via the testing environment service 102, its own dedicated development environment 220 to develop the ISV's functions and carry out pair-wise integration or other activities. Some embodiments include a progressive automated flow of network functions, features, or services into upper environments, with applicable thresholds, gates, or other enforcement mechanism, to allow ISVs and partners to continuously develop, integrate, and test their solutions against the communication service provider's communications network in parallel with one another, without being stalled, gated, or otherwise interfered by activity of another ISV or partner. As illustrated in FIG. 2, a progression of ISV and partner solutions from the sandbox environment 210, to development environment 220, to development performance environment 230, to integration environment 240, to integration performance environment 250, to pre-production environment 260, to production environment 270, can be implemented. In some embodiments, network functions, features, or services of different ISVs or other partners can enter or exit the same or different environments, at the same time or at different times. In some embodiments, different network functions, features, or services of the same ISV or other partner can enter or exit the same or different environments, at the same time or at different times.

Deployment in Environments

Network functions, features, or services (generally referred to as NFs) can be deployed in environments via continuous improvement continuous deployment (CICD) pipelines or other rule-based communication channels, facilitated by a rule enforcer component 204 of the testing environment service 102. In some embodiments, there is no manual deployment of NFs in any of the environments, all artifacts are consumable as code. Activities that necessitate updates to CICD pipelines (e.g., due to new development, bug fixes, or introduction of new platforms or features), can be documented by ISVs or other partners, and provided to the testing environment service 102 (e.g., via the rule enforcement component 204). The testing environment service 102 can update existing pipelines or create new pipelines (e.g., via applicable cloud computing service), to continue enabling automated deployment of NFs in the communications network.

Testing Scope

Individual environments can be used to continuously test with entry and exit criteria defined for each environment, which may represent the starting position and ending position of the testing types specific to different environments. NFs under testing are evaluated against the entry and exit criteria for entering or existing the current testing environment. The following table summarizes an example of the testing types in each of the testing environments.

| Environment | Testing Type | | | | | | |
|---|---|---|---|---|---|---|---|
| | Nodal | Pairwise | Integration | 3GPP | Performance | HA | Chaos |
| Development | X | X | | | | X (L)* | |
| Dev - Performance | | | | X | X | X (GR)** | |
| Integration | | | X | X | | X (L) | |
| Integration - Performance | | | | | X | X (GR) | |
| Pre-Production | | | | X | X | X (GR) | X |
| Production | | | | | X | | X |

The entry and exit criteria for individual environments can continuously evolve as the communication service provider matures its testing strategy and new test vectors, methodologies, and tools are introduced. The communication service provider can extend its own managed test equipment and configurations to vendor premises for specific scenarios (e.g., radio access network (RAN) Edge and multi-access edge computing (MEC)).

Test Documentation

Test cases, test results, or any issues identified during testing, in any environment, can be automatically tracked and recorded by a tracker component 202 of the testing environment service 102 (e.g., via a JIRA instance), which may feedback to or inform a corresponding development environment to further develop or test the affected NFs. The testing environment service 102 can instantiate bots and develop analytics to augment this process. In particular, tickets can be escalated automatically to partner systems or executives when turnaround time exceeds a threshold, and regular reminders can be shared.

Data Flow to Data Lake

Key performance indicators (KPIs), alarms, logs, or other metadata associated with the testing of NFs from any environment can be collected by the testing environment service 102 in real time, and flow into the communication service provider's data lake which supports functioning of the communications network.

Test Automation

The testing environment service 102 can replicate, emulate, or otherwise facilitate core in RAN or other NFs for testing (e.g., Spirent), other platforms, and the cloud computing service to automate the execution and capture of results from the test cases. The testing environment service 102 can also create a test App environment so that individual testers can participate.

Test Tools

ISVs and other partners can submit any specific test tools they introduce in their develop environments to the testing service provider 102, which in turn may share with other ISVs or partners.

Network Declared State

The testing environment service 102 can always maintain a declared state of the communications network (e.g., the current version of 5G core used by cells and user devices) that is the equivalent of the mainline code in software development. All the NFs, including their versions, configurations, topology, connectivity, and design, are published as part of the network declared state and all related data is consumable as code. In some embodiments, the declared network state can be maintained and published, can be the template for some or all environments, and/or can only be updated or changed by the testing environment service 102 via automation (e.g., when new NFs have completed testing through all environments and deployed). In some embodiments, manual changes to the declared state, e.g., by the communication service provider or any other party in any environment, can be blocked, strictly logged, and/or verified.

Example Environments

The development environment 220 can be the equivalent of a branch of the mainline code. The ISVs or other partners may clone all or part of the declared state into their specific development environment 220 to conduct their development and testing activities. Updated network functions delivered by an ISV from its development environment are tested against all the surrounding network functions and parameters ranges. This can be the gating, but not the only, exit criteria for the ISV functions to be promoted to the next higher environment. In some embodiments, ISVs may develop their own network functions in their development environment;

use their own development tools and emulators in their development environment to run large amounts of test vectors to verify parameter ranges;

use copies of surrounding network functions (their own and other ISVs) up to an exact and complete copy of the logical data center where the network function under development is or will be deployed into the communications network;

update and document configurations of their own network functions as code;

identify and document required configuration changes, in the surrounding network functions from other ISVs, based on the testing in the environment. The updated documentation (e.g., consumable as code) for this can be part of the exit criteria for promotion of the ISV functions to the next, higher environment.

In some embodiments, ISVs may not modify the version of the surrounding network functions in their development environment;

change the network design or architecture in their development environment;

use network functions that are not part of the declared state in their development environment.

The testing environment service 102 or ISVs may instantiate and terminate the development environments, e.g., based on need. The development environments can be predominantly meant for isolated, stand-alone development activities by ISVs. These activities can include parameter range test, failure tests, load tests, error testing, or the like. The testing results can expose what parts of the code and underlying resources have been tested (e.g., memory, input/output, network interface controller (NIC) performance, etc.). The testing environment service 102 can support connectivity to external virtual private clouds (VPCs) or entities, e.g., on a case-by-case basis.

The testing environment service 102 (e.g., using applicable cloud computing service) can communicate or otherwise interact with ISVs to ensure that the CICD pipelines associated with the ISV NFs are updated to account for all the changes required because of the development activities, and resulting outputs, to ensure the newer NF versions can continue to be instantiated and managed with full automation. This CICD pipeline updating can be part of the exit criteria.

The development performance environment 230 can mirror production based on the network declared state template. This environment can be maintained by the testing environment service 102, and in some embodiments, ISVs or other partners are not allowed to change topology, design, and configurations in this environment.

As described above, ISVs can document and provide to the testing environment service 102 the required updates (e.g., consumable as code) to their NF configurations and the surrounding NFs, based on the output of their own development environment 220. The testing environment service 102 (e.g., using applicable cloud computing service), can apply these changes into the development performance environment 230 to allow for the required testing and validation activities, to promote the configurations and release into the mainline code.

In some embodiments, the primary objective (e.g., part of exit criteria) of the development performance environment is to allow to conduct end-to-end 3GPP integration testing. Such testing can be fully automated and conducted by the communication service provider's testing partners.

In some embodiments, the secondary objective (e.g., part of exit criteria) of these environments is to allow performance benchmarking of the network functions against their published performance targets (e.g., validating that the user plane function (UPF) can handle traffic>10 Gbps).

Network configurations and associated NFs that pass the testing in this environment can be deemed to be accepted for deployment in the upper environments. As described above, entry and exit criteria can be used for evaluation automatically.

The output of this environment, in the form of method of procedures (MOPs), configurations, and artifacts (e.g., all consumable as code), when tested and verified, can be the final approved release that can then be promoted to upper environments.

Releases exiting this environment can be maintained as derivatives of the network declared state in the communication service provider's repositories and can be available for deployment into the integration environment described below. Any specific release that is deployed in production can become part of the updated, most current network declared state.

Integration environments 240 can be stable copies of the current network declared state, or of one of the derivative releases as described above. In some embodiments, these environments support different integration activities or themes, such as with chipset vendors, device vendors, Hardware/Radio Unit vendors, or specific end-to-end testing vectors.

In some embodiments, the primary objective (e.g., part of exit criteria) of these integration environments is to allow partners to do feature testing and certification against a stable network release. These environments 240 will not be used for development and integration activities by ISVs. Issues discovered with any ISV NF in these environments can be logged automatically, and the fixes can be developed in the respective development environment by the impacted ISV.

Successful testing and certification by a partner against the network functions can be part of the exit criteria from this environment. A certified network release can then be promoted to the integration performance environment 250, as described below.

The integration performance environment 250 can be the final gate for the integration environments 240. It can be used to develop the final configurations and conduct network performance benchmarking and other end-to-end testing. Successful testing and certification in this environment can be the basis for developing new releases for the upper environments.

The output from this environment 250, in the form of updated NF and network configurations, and updated documentation (e.g., all as code), can be used to develop updated CICD pipelines to deploy and configure network functions in the upper environments.

The pre-production environment 260 can be maintained as an exact copy of the current production network environment. However, as new releases are developed in the lower environments, the next target release for production can be introduced into the pre-production environment 260 to allow for full end-to-end feature, high availability (HA) and redundancy, performance, and soak testing for the duration as determined by the communication service provider.

When a release successfully passes the required testing in the pre-production environment 260, it can be approved for deployment in production. The release that is rolled into production can then be deemed the updated, most current network declared state.

The production environment 270 is the current running configuration (e.g., of network core, RAN, or other network functions) for the communications network, forming the basis of the network declared state carrying live traffic under service level agreements (SLAs). New releases promoted from the lower environments may be rolled out to the production environment 270 based on the communication service provider's business and technical requirements. In some embodiments, there will be only one network declared state for the current buildout. In some embodiments, there may be multiple versions of the production environments 270, e.g., based on the requirements of different slices that the communication service provider chooses to deploy in production.

In some embodiments, no development, testing, or integration activities are allowed in the production environment(s) 270. In some embodiments, the communication service provider's chaos testing can run extensive tests in the production environment(s). The testing environment service 102 can use testing to simulate new services and SLA.

Environment Control

Individual environments described above can have varying degrees of control by an ISV or other partner, who may make changes to the environments they are using. The environments can become progressively more restrictive to the ISV as network releases move up the stack. Illustratively, the ISVs or other partners can have the most control in the following—

Development environment in which
  ISVs can have control over the version of their NFs, which surrounding NFs they would like to replicate into their development environment. This can be maintained as code in the communication service provider's data repository, inventory, and/or data lake.
  ISVs can make changes to their NF code and configurations (e.g., delivered as code).
  ISVs can work with other ISVs of the surrounding NFs to develop updated configurations for end-to-end integration of their NF.
  ISVs can deploy and use their specific development and test tools to support their development activities.
  ISVs can work with applicable cloud computing service to update infrastructure configurations, as needed.

Integration environment in which
  ISVs may develop and test their device/chipset features against the communication service provider's communications network.
  ISVs may work with other ISVs to develop configuration changes required to test and certify their solutions.
  ISVs may deploy their specific development and test tools to support their testing and certification activities.
  ISVs may work with applicable cloud computing service to update infrastructure configurations, as needed.

In some embodiments, ISVs or other partners are not allowed, in any environment, to make changes to the overall network design or topology defined by the communication service provider.

Sync Process

The testing environment service 102 can implement a sync process to enable different environments to use the most current network declared state for their parallel development and testing activities. ISVs or other partners can be notified automatically when a new or updated version of the network declared state is available, and can be required to use the automated processes for deploying NFs (e.g., as developed by the applicable cloud computing service) to sync their individual environments to the latest network declared state before continuing their development and testing activities. The sync process can be used so that the ISVs or other partners develop and test against the version of the network that is or will be in production and, by extension that their NFs and solutions can be rolled into production without need for additional integration and testing.

Figure 3:
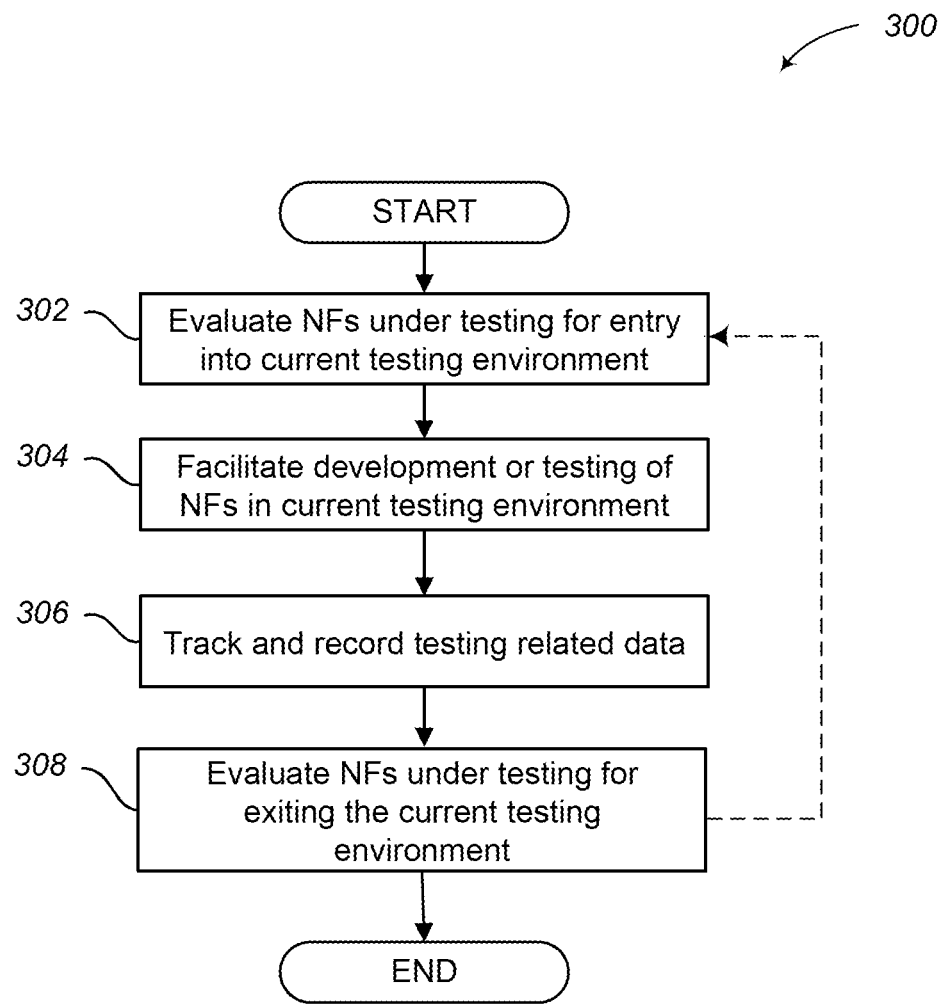
FIG. 3 is a flow diagram depicting an example process for facilitating testing of network functions for a communications network, in accordance with some embodiments of the techniques described herein.

FIG. 3 is a flow diagram depicting an example process 300 for facilitating testing of network functions, features, or services for a communications network, in accordance with some embodiments of the techniques described herein. In various embodiments, the process 300 is performed in real time, and at least some part of the process 300 is performed in a transparent manner to a user of the user device. Illustratively, at least some part of the process 300 can be implemented by the testing environment service 102 of FIG. 1, and performed in accordance with the description of FIG. 2.

The process 300 starts at block 302, which includes evaluating one or more NFs under testing for entry into a current testing environment. As described above with reference to FIG. 2, the one or more NFs can be under development or testing by an ISV or other partner associated with a communication service provider, for a communications network (e.g., the same communications network as described with reference to FIG. 2). The NFs can be received via CICDs, and the evaluation can be performed based on entry criteria associated with the current testing environment, which may represent the starting position of the testing types specific to the current testing environment as situated in a hierarchy of testing environments.

At block 304, the process 300 includes facilitating development or testing of the one or more NFs in the current testing environment. As described above with reference to FIG. 2, the testing environment service 102 can replicate, emulate, or otherwise facilitate network core, other network functions, other platforms, or at least a part thereof, and employ applicable cloud computing service to automate the execution and capture of results from test cases applied to the one or more NFs. The most current declared state of the communications network is provided as used as a basis for the development or testing of the one or more NFs.

At block 306, the process 300 includes tracking and recording data related to the testing. As described above with reference to FIG. 2, test cases, test results, or any issues identified during testing in the current environment can be automatically tracked and recorded. KPIs, alarms, logs, or other metadata associated with the testing of NFs from the current environment can be collected in real time, and flow into the communication service provider's data lake which supports functioning of the communications network.

At block 308, the process 300 includes evaluating the one or more NFs under testing for exiting the current testing environment. As described above with reference to FIG. 2, the evaluation can be performed based on exit criteria associated with the current testing environment, which may represent the ending position of the testing types specific to the current testing environment as situated in the hierarchy of testing environments. In some embodiments, the process 300 includes proceeding back to block 302 to further facilitate testing of the one or more NFs, e.g., via CICD to promote the one or more NFs to a higher testing environment (e.g., closer to deployment) in the hierarchy of testing environments.

The various operations depicted via FIGS. 2 and 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
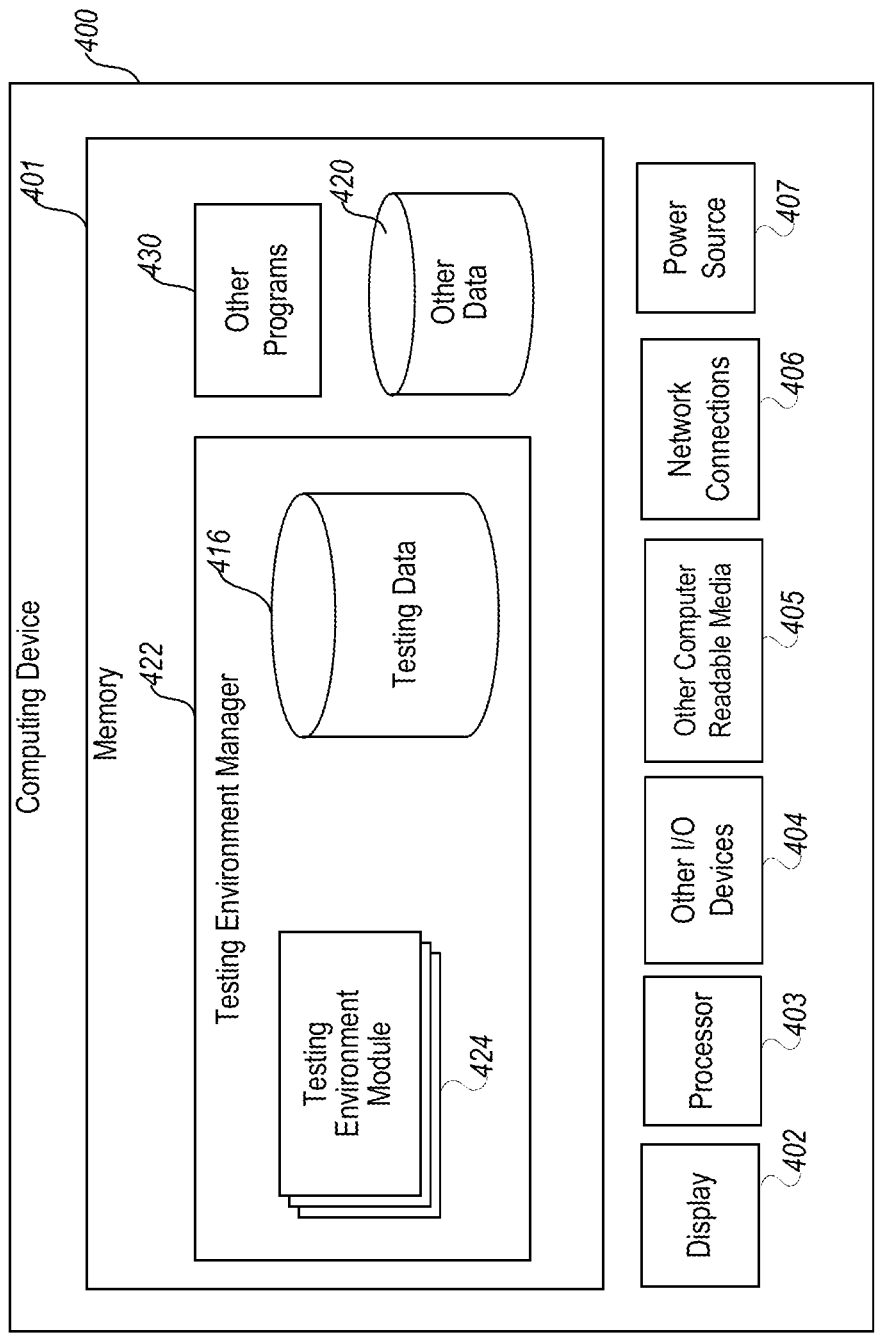
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to a testing environment service 102, an element or component of communication connections 110, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the testing environment manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units (CPU) or other processors 403, Input/Output (I/O) devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The testing environment manager 422 is shown residing in memory 401. In other embodiments, some portion of the contents and some, or all, of the components of the testing environment manager 422 may be stored on and/or transmitted over the other computer-readable media 405. The components of the computing device 400 and testing environment manager 422 can execute on one or more processors 403 and implement applicable functions described herein. In some embodiments, the testing environment manager 422 may operate as, be part of, or work in conjunction and/or cooperation with other software applications stored in memory 401 or on various other computing devices. In some embodiments, the testing environment manager 422 also facilitates communication with peripheral devices via the I/O devices 404, or with another device or system via the network connections 406.

The one or more testing environment modules 424 is configured to perform actions related, directly or indirectly, to testing facilitation as described herein. In some embodiments, the testing environment module(s) 424 stores, retrieves, or otherwise accesses at least some testing-related data on some portion of the testing data storage 416 or other data storage internal or external to the computing device 400. In various embodiments, at least some of the testing environment modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and testing environment manager 422 include API(s) that provides programmatic access to add, remove, or change one or more functions of the computing device 400. In some embodiments, components/modules of the computing device 400 and testing environment manager 422 are implemented using standard programming techniques. For example, the testing environment manager 422 may be implemented as an executable running on the processor(s) 403, along with one or more static or dynamic libraries. In other embodiments, the computing device 400 and testing environment manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the testing environment manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a testing environment manager 422 implementation. Also, other functions could be implemented and/or performed by each component/module, and in different orders, and by different components/modules, yet still achieve the functions of the computing device 400 and testing environment manager 422.

In addition, programming interfaces to the data stored as part of the computing device 400 and testing environment manager 422, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The testing data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the testing environment manager 422.

Furthermore, in some embodiments, some or all of the components of the computing device 400 and testing environment manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for facilitating testing associated with a 5G communications network, the method comprising:

maintaining a hierarchy of testing environments that replicate at least part of a network core of the 5G communications network to be consistent with a current declared state of the communications network, wherein the network core of the communications network is established virtually using one or more cloud computing services and wherein the hierarchy of testing environments are generated via the one or more cloud computing services;

evaluating one or more network functions associated with a first testing partner for entry into or exiting a first set of testing environments in the hierarchy; and tracking and recording data associated with testing of the one or more network functions in individual testing environments of the first set.

2. The method of claim 1, further comprising:

in a temporally parallel or partially overlapping manner with the evaluating of the one or more network functions associated with the first testing partner, evaluating one or more network functions associated with a second testing partner for entry into or exiting a second set of testing environments in the hierarchy.

3. The method of claim 2, wherein the first set of testing environments and the second set of testing environments have one or more testing environments in common.

4. The method of claim 2, wherein the evaluating of the one or more network functions associated with the second testing partner is performed independently from the evaluating of the one or more network functions associated with the first testing partner.

5. The method of claim 1, further comprising causing the one or more network functions to automatically enter or exit individual testing environments in accordance with the hierarchy, as code transferred via rule-enforceable pipelines.

6. The method of claim 1, wherein the current declared state of the communications network includes versions, configurations, topology, connectivity, and design of network functions currently running to carry live traffic for the communications network.

7. The method of claim 1, wherein the hierarchy of testing environments include a production environment as a highest environment that represents the current declared state of the communications network.

8. A testing facilitation system for a communications network, comprising:

at least one memory that stores computer executable instructions; and at least one processor that executes the computer executable instructions to cause actions to be performed, the actions comprising:

maintaining a hierarchy of testing environments that replicate at least part of a network core of the communications network to be consistent with a current declared state of the communications network, wherein the network core of the communications network is established virtually using one or more cloud computing services and wherein the hierarchy of testing environments are generated via the one or more cloud computing services;

evaluating one or more network functions associated with a first testing partner for entry into or exiting a first set of testing environments in the hierarchy; and tracking and recording data associated with testing of the one or more network functions in individual testing environments of the first set.

9. The system of claim 8, wherein the actions further comprise:

in a temporally parallel or partially overlapping manner with the evaluating of the one or more network functions associated with the first testing partner, evaluating one or more network functions associated with a second testing partner for entry into or exiting a second set of testing environments in the hierarchy.

10. The system of claim 9, wherein the first set of testing environments and the second set of testing environments have one or more testing environments in common.

11. The system of claim 9, wherein the evaluating of the one or more network functions associated with the second testing partner is performed independently from the evaluating of the one or more network functions associated with the first testing partner.

12. The system of claim 8, wherein the actions further comprise causing the one or more network functions to automatically enter or exit individual testing environments in accordance with the hierarchy, as code transferred via rule-enforceable pipelines.

13. The system of claim 8, wherein the current declared state of the communications network includes versions, configurations, topology, connectivity, and design of network functions currently running to carry live traffic for the communications network.

14. The system of claim 8, wherein the hierarchy of testing environments include a production environment as a highest environment that represents the current declared state of the communications network.

15. A non-transitory computer-readable medium storing contents that, when executed by one or more processors, cause the one or more processors to perform actions comprising:

maintaining a hierarchy of testing environments that replicate at least part of a network core of a communications network to be consistent with a current declared state of the communications network, wherein the network core of the communications network is established virtually using one or more cloud computing services and wherein the hierarchy of testing environments are generated via the one or more cloud computing services;

evaluating one or more network functions associated with a first testing partner for entry into or exiting a first set of testing environments in the hierarchy; and tracking and recording data associated with testing of the one or more network functions in individual testing environments of the first set.

16. The computer-readable medium of claim 15, wherein the actions further comprise:

in a temporally parallel or partially overlapping manner with the evaluating of the one or more network functions associated with the first testing partner, evaluating one or more network functions associated with a second testing partner for entry into or exiting a second set of testing environments in the hierarchy.

17. The computer-readable medium of claim 16, wherein the evaluating of the one or more network functions associated with the second testing partner is performed independently from the evaluating of the one or more network functions associated with the first testing partner.

18. The computer-readable medium of claim 15, wherein the actions further comprise causing the one or more network functions to automatically enter or exit individual testing environments in accordance with the hierarchy, as code transferred via rule-enforceable pipelines.

19. The computer-readable medium of claim 15, wherein the current declared state of the communications network includes versions, configurations, topology, connectivity, and design of network functions currently running to carry live traffic for the communications network.

20. The computer-readable medium of claim 15, wherein the hierarchy of testing environments include a production environment as a highest environment that represents the current declared state of the communications network.

* * * * *